J. F. METTEN.
MARINE PROPULSION.
APPLICATION FILED AUG. 18, 1916.
1,235,991.
Patented Aug. 7, 1917.
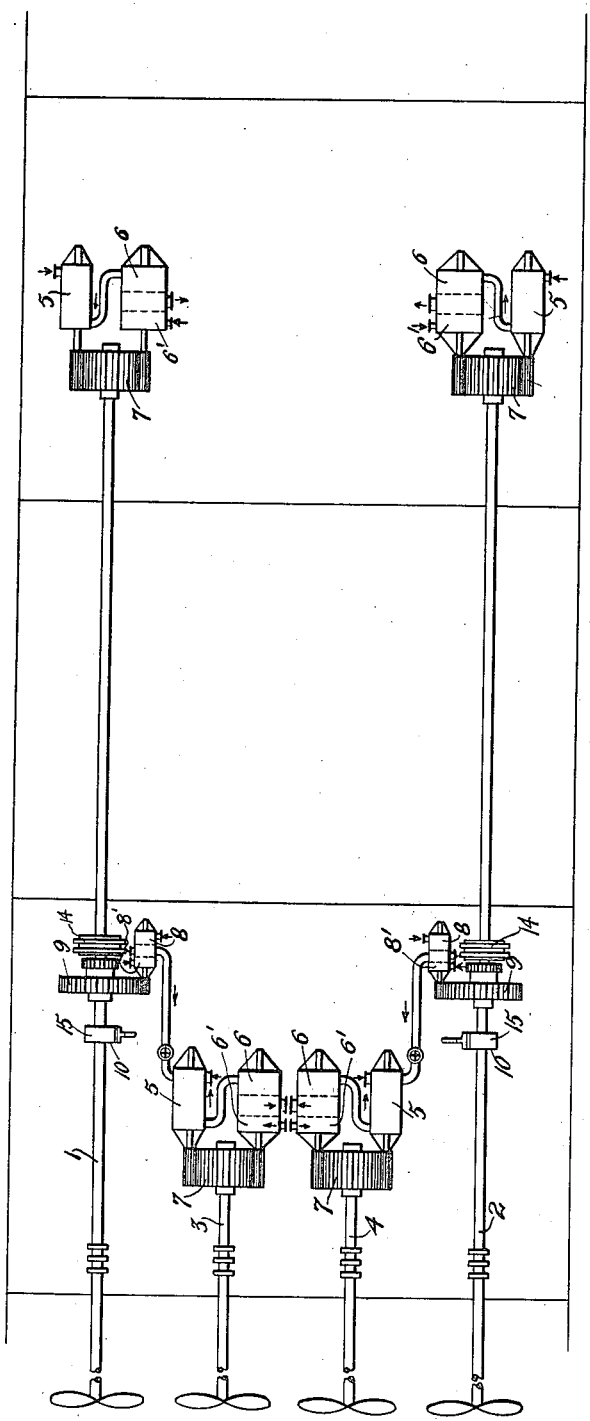
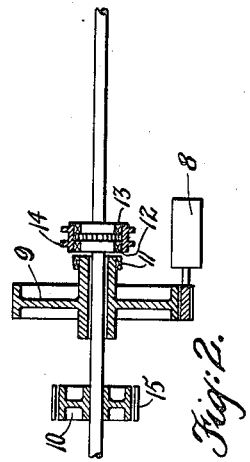
INVENTOR
John F. Metten,
BY
Edwards, Sager & Wooster,
ATTORNEYS.

UNITED STATES PATENT OFFICE.

JOHN F. METTEN, OF PHILADELPHIA, PENNSYLVANIA, ASSIGNOR TO THE WILLIAM CRAMP & SONS SHIP & ENGINE BUILDING COMPANY, A CORPORATION OF PENNSYLVANIA.

MARINE PROPULSION.

1,235,991.   Specification of Letters Patent.   Patented Aug. 7, 1917.

Application filed August 18, 1916. Serial No. 115,689.

*To all whom it may concern:*

Be it known that I, JOHN F. METTEN, a citizen of the United States, residing at Philadelphia, in the county of Philadelphia and State of Pennsylvania, have invented certain new and useful Improvements in Marine Propulsion, of which the following is a full, clear, and exact specification.

This invention relates to marine propulsion and has for its object an arrangement of geared turbines for improvement of economies at reduced powers.

The invention is especially applicable to naval vessels of high powers and speeds and in which it is desired to obtain the highest economies at predetermined cruising speeds for maximum radii of action of the vessel.

One arrangement is here shown, wherein there are four shafts and two engine rooms, one of which engine rooms is placed forward of the other and separated by a boiler room. At cruising speeds it is intended to disconnect the wing shafts at the after engine room, which will permit of the main units and all auxiliaries in the forward engine room being closed down, thus effecting a saving in total steam required. These wing shafts then are driven by high efficiency geared cruising turbines located in the after engine room. Another advantage outside of the increased economy is that the engine room personnel required when cruising will be reduced to one-half that for the higher powers. The geared cruising units are preferably arranged to work in steam series with the high and low pressure turbines driving center screws.

In the accompanying drawings,

Figure 1 is a diagrammatic plan view of a propulsion system embodying this invention, and Fig. 2 is a detail sectional view of parts shown in Fig. 1.

In Fig. 1, 1 and 2 are wing shafts and 3 and 4 the center shafts each of which at the higher powers is driven independently by a high and low pressure turbine, 5 and 6, through reduction gear 7, there being shown in the drawings four such high pressure turbines 5 and four such low pressure turbines 6. 8—8 are the cruising units driving at cruising speeds through gears, 9—9, wing shafts 1 and 2 respectively. The four low pressure turbines 6 of the main driving sets are provided with built in reversing turbines 6' and the two cruising turbines 8 each have a special one stage reversing turbine 8' incorporated therein.

Each wing shaft, for example, comprises two sections provided with coöperating clutch jaws. The aft section of each wing shaft carries a propeller, and the shaft brakes 10—10 for holding the shafts stationary while the clutches, forward of the cruising gears, are being shifted to change the drive from one engine room to the other. Each clutch has three jaws, see Fig. 2, one 11, being mounted on the spindle of gear 9 loosely sleeved on the wing shaft, a second, 12, mounted on the after section of the main shaft, and a third, 13, mounted on the forward section of the main shaft. A sliding collar, 14, can be made to mesh with either 12 and 13, when the drive is from the main forward high power units, or 12 and 11 when the forward units are disconnected and the drive is from the geared cruising units. The brake wheel, 10, has a stationary fixed band, 15, which when contracted will prevent shafts 1 and 2 from being revolved by their respective propellers.

The method of procedure for disconnecting the main wing units and putting cruising units into operation, is as follows: The speed of the vessel is reduced to a convenient cruising speed with all four main unit pairs 5—6 connected. Continuing to drive with the main center units only at this speed, steam is admitted to those reversing turbines 6'—6' which are incorporated in the two main low pressure turbines 6—6 associated with wing shafts 1, 2. When shafts 1 and 2 have been brought to a standstill, the holding brakes 15 are applied, and collar 14 of each clutch, is shifted so as to mesh with jaws 11 and 12. The brakes are then released, and high pressure steam admitted to the cruising units 8, 8, each exhausting to its adjacent high pressure turbine 5. The four turbines 6', 6', can also be used for reversing the vessel.

To disconnect the cruising units and connect in the main units, the reverse operation is performed. Continuing to drive with the two main units 5—6 associated with center shafts 3, 4, shafts 1 and 2 are each brought to a stop by admitting steam to the special reversing one stage turbine 8' incorporated in each cruising turbine 8. The brakes 15 are applied to hold the shafts 1 and 2 stationary, while clutch collars 14—14 are shifted forward, disconnecting the cruising units 8—8 and connecting in the forward main units 5—6, 5—6.

By the propulsion system above described the driving units are separated into two groups at high speeds separated longitudinally of the vessel and producing a novel distribution of the engines involved. The boiler room is centrally located and separates the engine groups in a manner which decreases the liability of both groups to disablement making for safety and reliability of operation. At cruising speed the auxiliary engine room with all its appurtenances can be entirely closed and all the shafts driven from the main engine room. The speed changes are quickly accomplished without interrupting the operation of the central shafts and without stopping the progress of the vessel. There is thus accomplished a great saving of steam and approximately a halving of the personnel required to care for the engine apparatus.

It is apparent that the propulsion system of this invention is not confined to the particular arrangements shown but may be applied to any vessel having two or more shafts, and the several units may be interconnected in ways other than as described herein, within the scope of the appended claims.

Having thus described my invention, I declare that what I claim as new and desire to secure by Letters Patent, is:—

1. In a marine steam turbine installation, separate forward and after engine rooms, the forward engine room containing main geared units, wing shafts driven respectively by said units, the after engine room containing main geared turbines, center shafts driven by said last mentioned turbines respectively, means for disconnecting the forward main units at the after engine room, high pressure turbines, and means for connecting said wing shafts to be driven by said high pressure turbines.

2. In a four-shaft marine steam turbine installation, a forward engine room, main geared units located therein for driving two of the shafts to develop high power, an after engine room, similar units therein for driving the other two shafts to develop high power, means for stopping and holding said first mentioned two shafts in order to disengage the main units in the forward engine room therefrom, special geared cruising turbines, means to connect the same with said first mentioned two shafts after they have been disconnected from the units in the forward engine room, and means for reconnecting the units in the after room in steam series for cruising.

3. In a marine steam turbine installation, a plurality of shafts, main geared turbines to drive said shafts, special geared cruising turbines, means for stopping and holding part of said shafts in order to disconnect the respective main units therefrom and reconnect the special geared cruising turbines therewith, and means for reconnecting certain of the units in steam series for cruising.

4. In a marine propulsion system, two propeller shafts, respective main turbines therefor, an auxiliary turbine, means to connect either a main turbine or an auxiliary turbine alternatively to drive one of said shafts, and means to supply exhaust steam from the auxiliary turbine to another main turbine when the auxiliary turbine is in operation.

5. In a marine propulsion system, a forward engine room, a propeller shaft extending through both rooms and comprising two alining segments with their proximate ends in the after room, a gear wheel on the end of the after segment adjacent to the end of the forward segment, a clutch connection adapted alternatively to engage said gear wheel with the after shaft or to engage said segments together, a turbine in the forward engine room connected to the forward shaft segment, another propeller shaft in the after engine room, a turbine connected therewith, and an auxiliary turbine in the after engine room having a pinion on its rotor shaft in engagement with said gear wheel.

6. In a marine propulsion system, a forward engine room, an after engine room, like turbine units, one in each room, propeller shafts driven thereby respectively, another turbine unit in the after engine room adapted to be connected alternatively with the same shaft as the turbine unit in the forward engine room and means to connect the two turbines in the after engine room in steam series.

7. In a propulsion system, a plurality of shafts, two engine rooms, a propeller on each shaft, driving means for full power for one shaft in one engine room and for another shaft in the other engine room, means for disconnecting one of said driving means from its shaft, a separate driving means in said other engine room for reduced power adapted to be connected to said last mentioned shaft when the first mentioned driving means is disconnected therefrom, and means to operate the driving means for the other shaft at reduced power when the said separate driving means is connected as aforesaid.

8. In a propulsion system comprising a plurality of shafts each having a propeller and driving means for full power, means for disconnecting one of said driving means from its shaft, and a separate driving means adapted to be connected thereto upon disconnection of said full power means for driving said shaft at reduced power, and means for connecting the full power driving means of another shaft in series with said separate driving means to obtain a like reduced power thereon.

9. In a propulsion system having a plurality of shafts and a plurality of engine rooms, a main driving engine in one of said rooms for driving one of said shafts at full speed, an auxiliary driving engine in another room for driving said shaft at lower speeds, and means for holding said shaft stationary to change from one driving unit to another without stopping the vessel.

10. In a propulsion system, main driving units in two engine rooms for driving a plurality of propeller shafts at high power, auxiliary driving units in one of those rooms for driving certain of said shafts at lower power, and means in the same one room for stopping and holding said latter shafts to mechanically change the driving units without stopping the vessel.

11. In a propulsion system having a plurality of propeller shafts, the combination with geared turbines in different engine rooms for driving each shaft at high power, of an auxiliary geared turbine in one of those rooms for driving one of said shafts at lower power, and means for bringing said auxiliary turbine into or out of operative relation with its shaft independently of the remaining shafts.

12. In a propulsion system including a plurality of shafts, the combination with a plurality of turbines for driving each of said shafts at full power, the turbines for one shaft being forward of those for the other shaft, of an auxiliary turbine adjacent the turbines of said latter shaft for driving said first mentioned shaft at lower speeds, means for disconnecting the forward turbine and connecting the auxiliary turbine, and means for putting the auxiliary turbine and the adjacent turbine in steam series.

13. In a propulsion system, the combination with a propeller shaft turbine in a relatively forward position, of a propeller shaft extending aft from said driving means, a second propeller shaft, a driving turbine therefrom rearwardly of that for said other shaft, auxiliary driving means for said first shaft adjacent said driving turbine, means for connecting said forward turbine or said auxiliary turbine to said first shaft, and steam flow interconnections so as to drive said shafts at reduced power when said auxiliary turbine is in operation.

14. In a propulsion system, the combination with propeller shaft driving means in a forward room, a propeller shaft section extending aft from said driving means, a second propeller shaft section extending aft from said first section, auxiliary driving means, a clutch between said auxiliary driving means and said second section and between said second section and said first section, and braking means on said second section to hold it stationary for operation of said clutch.

15. In a ship propulsion system, the combination with two shafts driven by similar high and low pressure turbine sets at higher power, of an auxiliary high pressure turbine for driving one of said shafts at lower power, and means for connecting the exhaust of said high pressure turbine to the turbines of the other shaft at lower power.

16. In a ship propulsion system, the combination with shafts driven by similar sets of high and low pressure steam turbines at higher power, of clutching means separating one of said shafts into sections, an auxiliary high pressure turbine, means for connecting said auxiliary turbine to one of said shaft sections to drive said shaft at lower power, and means connecting the exhaust of said auxiliary turbine to the driving turbines for the other shaft.

17. In a propulsion system, a plurality of propeller shafts, a forward engine room and an after engine room, all of said shafts extending into the after engine room and part of them extending therefrom into the forward engine room, means for driving all the propeller shafts at cruising power or for driving all of said shafts at higher power as desired, said means being disposed partly in each of said engine rooms, and means for disconnecting part of the means for driving at cruising power when the connections are made for driving at full power.

In testimony whereof I affix my signature, in presence of two witnesses.

JOHN F. METTEN.

Witnesses:
 FRANCIS L. CRAMP,
 J. H. McMASTER.